(12) United States Patent
Lai

(10) Patent No.: US 10,148,308 B2
(45) Date of Patent: Dec. 4, 2018

(54) AUXILIARY CHANNEL TRANSCEIVING CIRCUIT OF DISPLAYPORT INTERFACE

(71) Applicant: Realtek Semiconductor Corp., Hsinchu (TW)

(72) Inventor: Chun-Hao Lai, Taipei (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 15/788,975

(22) Filed: Oct. 20, 2017

(65) Prior Publication Data

US 2018/0175900 A1    Jun. 21, 2018

(30) Foreign Application Priority Data

Dec. 21, 2016 (TW) .............................. 105142400 A

(51) Int. Cl.
*H04B 1/40* (2015.01)
*H04L 25/02* (2006.01)
(52) U.S. Cl.
CPC ............ *H04B 1/40* (2013.01); *H04L 25/028* (2013.01); *H04L 25/0264* (2013.01); *H04L 25/0272* (2013.01); *H04L 25/0276* (2013.01); *H04L 25/0278* (2013.01); *H04L 25/0294* (2013.01); *H04L 25/0298* (2013.01)

(58) Field of Classification Search
CPC ... H04B 1/40; H04L 25/0264; H04L 25/0272; H04L 25/0276; H04L 25/0278; H04L 25/028; H04L 25/0294; H04L 25/0298
See application file for complete search history.

(56) References Cited

U.S. PATENT DOCUMENTS 8,638,838 B1 * 1/2014 Betts .......................... H04L 5/16
326/30
2017/0222848 A1 * 8/2017 Sun ........................ H04L 7/0012

* cited by examiner

*Primary Examiner* — David B. Lugo
(74) *Attorney, Agent, or Firm* — Birch, Stewart, Kolasch & Birch, LLP

(57) ABSTRACT

An auxiliary channel transceiving circuit includes: a first node and a second node; a first voltage-dividing circuit for generating a first received signal according to a signal from the first node; a second voltage-dividing circuit for generating a second received signal according to a signal from the second node; a first receiver amplifying circuit for amplifying the first received signal to generate a first amplified signal; a second receiver amplifying circuit for amplifying the second received signal to generate a second amplified signal; a comparison circuit for comparing the first amplified signal with the second amplified signal to generate a received signal; a first transmitter amplifying circuit for generating a first output signal according to a transmitting signal; and a second transmitter amplifying circuit for generating a second output signal according to the transmitting signal. The auxiliary channel transceiving circuit is not required to cooperate with traditional capacitors.

7 Claims, 2 Drawing Sheets they fulfill the specifications defined by VESA (Video Electronics Standards Association). # AUXILIARY CHANNEL TRANSCEIVING CIRCUIT OF DISPLAYPORT INTERFACE

CROSS-REFERENCE TO RELATED APPLICATIONS

This application claims the benefit of priority to Patent Application No. 105142400, filed in Taiwan on Dec. 21, 2016; the entirety of which is incorporated herein by reference for all purposes.

BACKGROUND

The disclosure generally relates to a transceiving circuit complying with the DisplayPort (DP) series specifications defined by VESA (Video Electronics Standards Association) and, more particularly, to an auxiliary channel transceiving circuit for use in the DisplayPort interface.

The DP series specifications have defined a data transmission channel and an auxiliary channel (AUX channel), and each channel adopted the differential signal transmission structure. In the traditional structure, two differential input signals have different DC voltage level, and thus two capacitors are required in the AUX channel transceiving circuit to block DC components.

The aforementioned capacitors require larger circuit area and are therefore not suitable to be integrated into a single integrated circuit with other circuit components. Accordingly, it requires additional circuit board space to place the aforementioned capacitors. However, it is difficult for the traditional circuit structure to further reduce the overall circuit components of the AUX channel transceiving circuit.

SUMMARY

An example embodiment of an auxiliary channel transceiving circuit of a DisplayPort (DP) interface is disclosed, comprising: a pair of differential signal transmission nodes comprising a first node and a second node; a first voltage-dividing circuit, coupled with the first node, arranged to operably generate a first received signal based on a first auxiliary signal transmitted from the first node; a second voltage-dividing circuit, coupled with the second node, arranged to operably generate a second received signal based on a second auxiliary signal transmitted from the second node; a first receiver amplifying circuit, coupled with the first voltage-dividing circuit, arranged to operably amplify the first received signal to generate a first amplified signal; a second receiver amplifying circuit, coupled with the second voltage-dividing circuit, arranged to operably amplify the second received signal to generate a second amplified signal; a comparison circuit, coupled with the first receiver amplifying circuit and the second receiver amplifying circuit, arranged to operably compare the first amplified signal with the second amplified signal to generate a received signal; a first transmitter amplifying circuit, arranged to operably generate a first output signal having a first DC voltage level based on a transmitting signal; a second transmitter amplifying circuit, arranged to operably generate a second output signal having a second DC voltage level based on the transmitting signal; a first resistor, coupled between an output terminal of the first transmitter amplifying circuit and the first node; and a second resistor, coupled between an output terminal of the second transmitter amplifying circuit and the second node; wherein the first auxiliary signal and the second auxiliary signal constitute a pair of differential signals, the first output signal and the second output signal constitute a pair of differential signals, and the first DC voltage level differs from the second DC voltage level.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
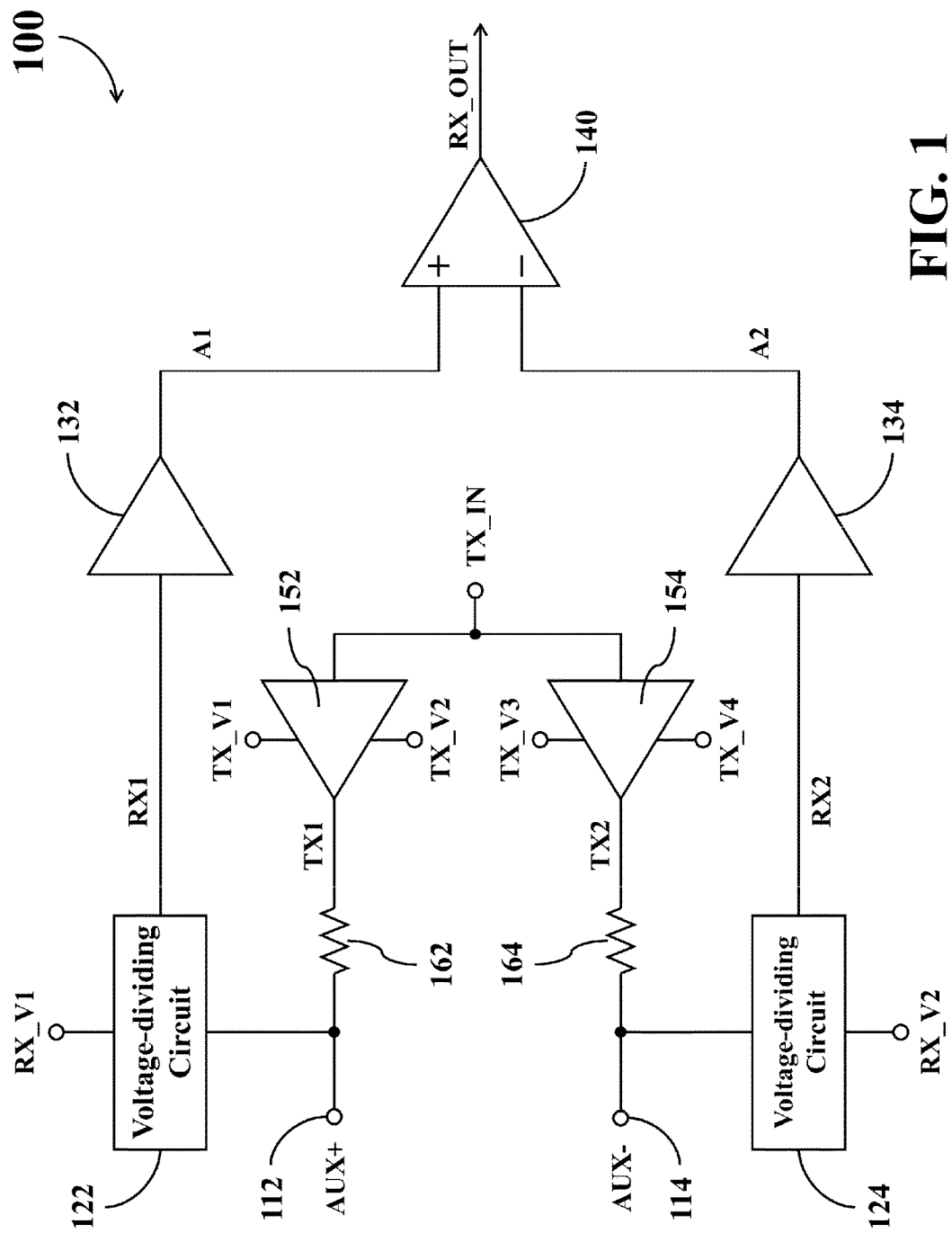
FIG. 1 shows a simplified functional block diagram of an auxiliary channel transceiving circuit according to one embodiment of the present disclosure.

FIG. 1 shows a simplified functional block diagram of an auxiliary channel transceiving circuit 100 according to one embodiment of the present disclosure. The auxiliary channel transceiving circuit 100 is utilized in the transceiving circuits supporting the DisplayPort (DP) series specifications (including Mini-DP or mDP series specifications).

In this embodiment, the auxiliary channel transceiving circuit 100 comprises a pair of differential signal transmission nodes (including a first node 112 and a second node 114), a first voltage-dividing circuit 122, a second voltage-dividing circuit 124, a first receiver amplifying circuit 132, a second receiver amplifying circuit 134, a comparison circuit 140, a first transmitter amplifying circuit 152, a second transmitter amplifying circuit 154, a first resistor 162, and a second resistor 164.

The first node 112 and the second node 114 are arranged to operably couple with a corresponding connector (not shown in FIG. 1) to receive or transmit a first auxiliary signal AUX+ and a second auxiliary signal AUX−, which constitute a pair of differential signals. When the auxiliary channel transceiving circuit 100 operates in the receiving mode, the auxiliary channel transceiving circuit 100 may generate a corresponding received signal RX_OUT based on the first auxiliary signal AUX+ and the second auxiliary signal AUX−. On the other hand, when the auxiliary channel transceiving circuit 100 operates in the transmitting mode, the auxiliary channel transceiving circuit 100 may generate the first auxiliary signal AUX+ and the second auxiliary signal AUX− based on a transmitting signal TX_IN provided by other circuit (not shown in FIG. 1).

As shown in FIG. 1, the first voltage-dividing circuit 122 is coupled between the first node 112 and a first operating voltage RX_V1. The first voltage-dividing circuit 122 is arranged to operably conduct a voltage-dividing operation on the first auxiliary signal AUX+ transmitted from the first node 112 to generate a first received signal RX1 based on the first auxiliary signal AUX+. The second voltage-dividing circuit 124 is coupled between the second node 114 and a second operating voltage RX_V2. The second voltage-dividing circuit 124 is arranged to operably conduct a voltage-dividing operation on the second auxiliary signal AUX− transmitted from the second node 114 to generate a second received signal RX2 based on the second auxiliary signal AUX−. The first auxiliary signal AUX+ and the second auxiliary signal AUX− are enabled to have substantially the same DC voltage level due to the operations of the first voltage-dividing circuit 122 and the second voltage-dividing circuit 124. In practice, the first operating voltage RX_V1 and the second operating voltage RX_V2 may respectively configured to be different voltage levels, while the first voltage-dividing circuit 122 and the second voltage-dividing circuit 124 may be configured to have substantially the same equivalent resistance value.

The first receiver amplifying circuit 132 is coupled with the first voltage-dividing circuit 122, and arranged to operably amplify the first received signal RX1 to generate a first amplified signal A1. The second receiver amplifying circuit 134 is coupled with the second voltage-dividing circuit 124, and arranged to operably amplify the second received signal RX2 to generate a second amplified signal A2. In addition, the first receiver amplifying circuit 132 also functions to block the resistor-capacitor coupling (RC coupling) effect between the first voltage-dividing circuit 122 and the comparison circuit 140, while the second receiver amplifying circuit 134 also functions to block the RC coupling effect between the second voltage-dividing circuit 124 and the comparison circuit 140. In practice, each of the first receiver amplifying circuit 132 and the second receiver amplifying circuit 134 may be realized with various amplifier structures.

The comparison circuit 140 is coupled with the first receiver amplifying circuit 132 and the second receiver amplifying circuit 134, and arranged to operably compare the first amplified signal A1 with the second amplified signal A2 to generate the received signal RX_OUT. In practice, the comparison circuit 140 may be realized with various types of comparators.

The first transmitter amplifying circuit 152 is arranged to operably generate a first output signal TX1 having a first DC voltage level based on the aforementioned transmitting signal TX_IN. The second transmitter amplifying circuit 154 is arranged to operably generate a second output signal TX2 having a second DC voltage level based on the aforementioned transmitting signal TX_IN. The first output signal TX1 and the second output signal TX2 constitute a pair of differential signals and the first DC voltage level differs from the second DC voltage level. In practice, each of the first transmitter amplifying circuit 152 and the second transmitter amplifying circuit 154 may be realized with various types of amplifiers having single-ended input structure.

The first resistor 162 is coupled between the first node 112 and an output terminal of the first transmitter amplifying circuit 152. The second resistor 164 is coupled between the second node 114 and an output terminal of the second transmitter amplifying circuit 154. In this embodiment, the first resistor 162 and the second resistor 164 are configured to have substantially the same resistance value, such as 50 ohms.

In the auxiliary channel transceiving circuit 100, the first transmitter amplifying circuit 152 is coupled between a first voltage level TX_V1 and a second voltage level TX_V2, while the second transmitter amplifying circuit 154 is coupled between a third voltage level TX_V3 and a fourth voltage level TX_V4. The aforementioned first voltage level TX_V1 may differ from the third voltage level TX_V3, and the second voltage level TX_V2 may differ from the fourth voltage level TX_V4.

In one embodiment, for example, the first voltage level TX_V1 may be configured to be 0.3-1.3 volts (e.g., 0.3, 0.5, 0.8, 1.0, or 1.3 volts) while the second voltage level TX_V2 is configured to be 0 volt or grounded. On the other hand, the third voltage level TX_V3 may be configured to be 3.3 volts while the fourth voltage level TX_V4 is configured to be 2.0-3.0 volts (e.g., 2.0, 2.3, 2.5, 2.8, or 3.0 volts).

In the embodiments where the auxiliary channel transceiving circuit 100 is utilized to be a source-side auxiliary channel transceiving circuit, the equivalent resistance value of both the first voltage-dividing circuit 122 and the second voltage-dividing circuit 124 may be configured to be 10K ohms In the embodiments where the auxiliary channel transceiving circuit 100 is utilized to be a sink-side auxiliary channel transceiving circuit, the equivalent resistance value of both the first voltage-dividing circuit 122 and the second voltage-dividing circuit 124 may be configured to be 1M ohms.

Please note that no capacitor element is arranged on a first signal receiving path between the first voltage-dividing circuit 122 and the comparison circuit 140, and no capacitor element is arranged on a second signal receiving path between the second voltage-dividing circuit 124 and the comparison circuit 140.

Other the other hand, no capacitor element is arranged on a first signal transmitting path between the first node 112 and the first transmitter amplifying circuit 152, and no capacitor element is arranged on a second signal transmitting path between the second node 114 and the second transmitter amplifying circuit 154.

Figure 2:
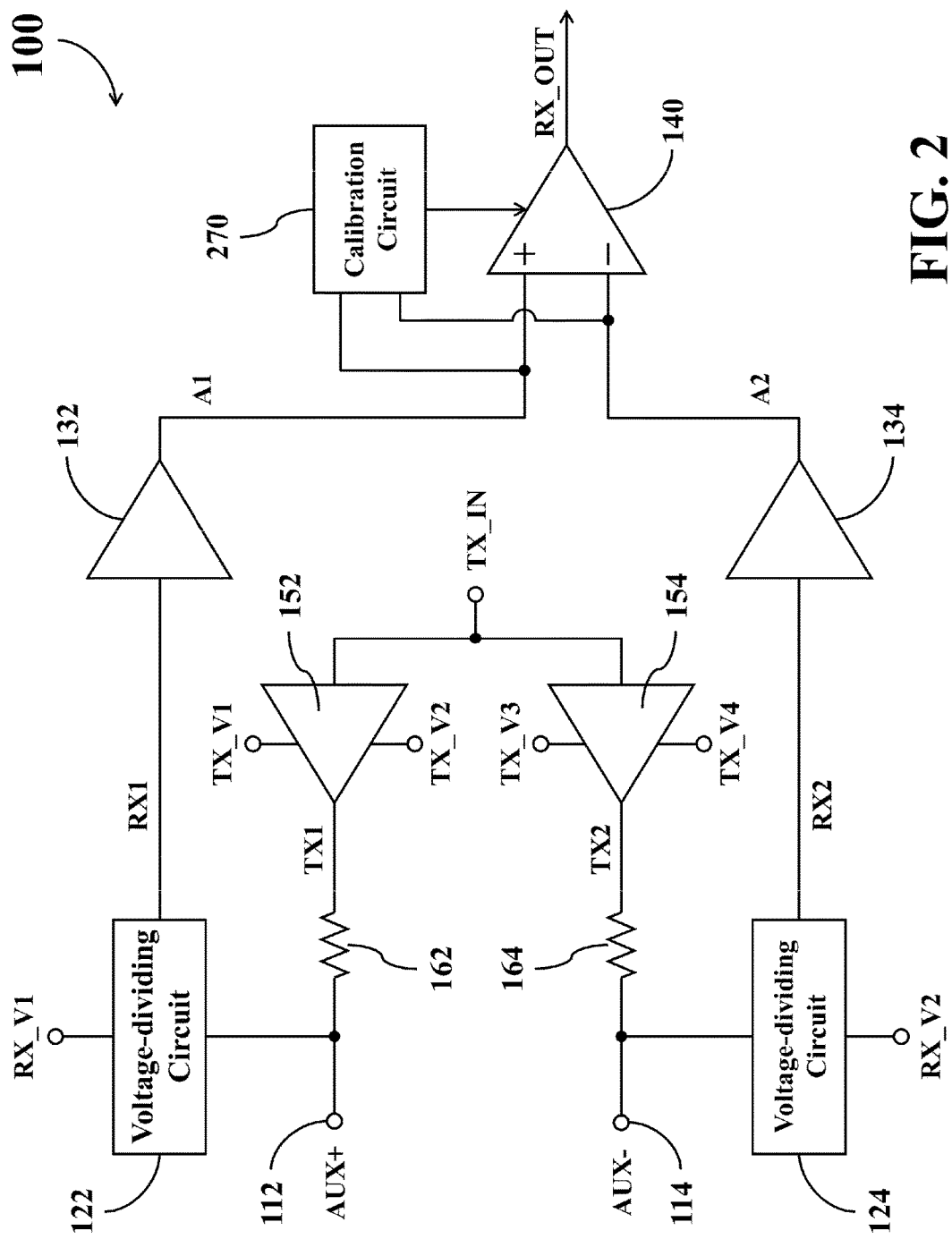
FIG. 2 shows a simplified functional block diagram of an auxiliary channel transceiving circuit according to another embodiment of the present disclosure.

Please refer to FIG. 2, which shows a simplified functional block diagram of the auxiliary channel transceiving circuit 100 according to another embodiment of the present disclosure. The embodiment of FIG. 2 is similar with the embodiment of FIG. 1, but the auxiliary channel transceiving circuit 100 in FIG. 2 further comprises a calibration circuit 270.

As shown in FIG. 2, the calibration circuit 270 is coupled with the first receiver amplifying circuit 132, the second receiver amplifying circuit 134, and the comparison circuit 140. The calibration circuit 270 is arranged to operably detect mismatch between the DC voltage level of the first amplified signal A1 and the DC voltage level of the second amplified signal A2, and to operably control the comparison circuit 140 to correspondingly compensate the received signal RX_OUT accordingly.

For example, the calibration circuit 270 may detect the DC voltage difference between the two input terminals of the comparison circuit 140, and control the comparison circuit 140 to adjust the magnitude its output current or output voltage according to the detection result of the calibration circuit 270 to compensate the received signal RX_OUT. In practice, the calibration circuit 270 may be realized with various existing DC voltage mismatch calibration circuits.

The foregoing descriptions regarding the connections, implementations, operations, and related advantages of other corresponding components in FIG. 1 are also applicable to the embodiment of FIG. 2. For the sake of brevity, those descriptions will not be repeated here.

Please note that the aforementioned structures of the auxiliary channel transceiving circuit 100 are merely exemplary embodiments, rather than restrictions to practical implementations. For example, the comparison circuit 140 may be instead realized with other comparator structure having differential outputs. Each of the first transmitter amplifying circuit 152 and the second transmitter amplifying circuit 154 may be instead realized with other amplifier structure having differential inputs.

As described previously, the first receiver amplifying circuit 132 also functions to block the RC coupling effect between the first voltage-dividing circuit 122 and the comparison circuit 140, and the second receiver amplifying circuit 134 also functions to block the RC coupling effect between the second voltage-dividing circuit 124 and the comparison circuit 140. Accordingly, the disclosed auxiliary channel transceiving circuit 100 is enabled to normally receive signals without cooperating with any traditional capacitor, and thus there is no need to place the traditional capacitors and resistors in additional circuit board space. As a result, the overall circuit components can be effectively reduced.

In addition, all circuit components of the auxiliary channel transceiving circuit 100 can be integrated into a single integrated circuit to effectively reduce the quantity of circuit components since it does not need to arranged any capacitor between the first node 112 and the comparison circuit 140, does not need to arranged any capacitor between the second node 114 and the comparison circuit 140, does not need to arranged any capacitor between the first node 112 and the first transmitter amplifying circuit 152, and does not need to arranged any capacitor between the second node 114 and the second transmitter amplifying circuit 154.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. An auxiliary channel transceiving circuit (100) of a DisplayPort (DP) interface, auxiliary channel transceiving circuit (100) comprising:
   a pair of differential signal transmission nodes (112, 114) comprising a first node (112) and a second node (114);
   a first voltage-dividing circuit (122), coupled with the first node (112), arranged to operably generate a first received signal (RX1) based on a first auxiliary signal (AUX+) transmitted from the first node (112);
   a second voltage-dividing circuit (124), coupled with the second node (114), arranged to operably generate a second received signal (RX2) based on a second auxiliary signal (AUX−) transmitted from the second node (114);
   a first receiver amplifying circuit (132), coupled with the first voltage-dividing circuit (122), arranged to operably amplify the first received signal (RX1) to generate a first amplified signal (A1);
   a second receiver amplifying circuit (134), coupled with the second voltage-dividing circuit (124), arranged to operably amplify the second received signal (RX2) to generate a second amplified signal (A2);
   a comparison circuit (140), coupled with the first receiver amplifying circuit (132) and the second receiver amplifying circuit (134), arranged to operably compare the first amplified signal (A1) with the second amplified signal (A2) to generate a received signal (RX_OUT);
   a first transmitter amplifying circuit (152), arranged to operably generate a first output signal (TX1) having a first DC voltage level based on a transmitting signal (TX_IN);
   a second transmitter amplifying circuit (154), arranged to operably generate a second output signal (TX2) having a second DC voltage level based on the transmitting signal (TX_IN);
   a first resistor (162), coupled between an output terminal of the first transmitter amplifying circuit (152) and the first node (112); and
   a second resistor (164), coupled between an output terminal of the second transmitter amplifying circuit (154) and the second node (114);
   wherein the first auxiliary signal (AUX+) and the second auxiliary signal (AUX−) constitute a pair of differential signals, the first output signal (TX1) and the second output signal (TX2) constitute a pair of differential signals, and the first DC voltage level differs from the second DC voltage level.

2. The auxiliary channel transceiving circuit (100) of claim 1, wherein the first transmitter amplifying circuit (152) is coupled between a first voltage level (TX_V1) and a second voltage level (TX_V2), the second transmitter amplifying circuit (154) is coupled between a third voltage level (TX_V3) and a fourth voltage level (TX_V4), the first voltage level (TX_V1) differs from the third voltage level (TX_V3), while the second voltage level (TX_V2) differs from the fourth voltage level (TX_V4).

3. The auxiliary channel transceiving circuit (100) of claim 1, wherein no capacitor element is arranged on a first signal transmitting path between the first node (112) and the first transmitter amplifying circuit (152), and no capacitor element is arranged on a second signal transmitting path between the second node (114) and the second transmitter amplifying circuit (154).

4. The auxiliary channel transceiving circuit (100) of claim 1, wherein no capacitor element is arranged on a first signal receiving path between the first voltage-dividing circuit (122) and the comparison circuit (140), and no capacitor element is arranged on a second signal receiving path between the second voltage-dividing circuit (124) and the comparison circuit (140).

5. The auxiliary channel transceiving circuit (100) of claim 1, wherein the first resistor (162) and the second resistor (164) are configured to have substantially same resistance value.

6. The auxiliary channel transceiving circuit (100) of claim 1, further comprising:
   a calibration circuit (270), coupled with the first receiver amplifying circuit (132), the second receiver amplifying circuit (134), and the comparison circuit (140), arranged to operably detect mismatch between DC voltage levels of the first amplified signal (A1) and the second amplified signal (A2), and to operably control the comparison circuit (140) to correspondingly compensate the received signal (RX_OUT) accordingly.

7. The auxiliary channel transceiving circuit (100) of claim 1, wherein the first receiver amplifying circuit (132) is further arranged to operably block a RC coupling effect between the first voltage-dividing circuit (122) and the comparison circuit (140), and the second receiver amplifying circuit (134) is further arranged to operably block a RC coupling effect between the second voltage-dividing circuit (124) and the comparison circuit (140).

\* \* \* \* \*